US009165266B2

(12) United States Patent
Boss et al.

(10) Patent No.: US 9,165,266 B2
(45) Date of Patent: Oct. 20, 2015

(54) RESOURCE MANAGEMENT FRAMEWORK FOR HOLDING AUCTIONS AND APPLYING SERVICE LEVEL CHARACTERISTICS IN RESPONSE TO BIDS FOR RESOURCES

(75) Inventors: Gregory J. Boss, American Fork, UT (US); Christopher J. Dawson, Arlington, VA (US); Rick A. Hamilton, II, Charlottesville, VA (US); Timothy M. Waters, Hiram, GA (US)

(73) Assignee: International Business Machines Corporation, Armonk, NY (US)

( * ) Notice: Subject to any disclaimer, the term of this patent is extended or adjusted under 35 U.S.C. 154(b) by 1179 days.

(21) Appl. No.: 11/756,367

(22) Filed: May 31, 2007

(65) Prior Publication Data

US 2008/0300891 A1 Dec. 4, 2008

(51) Int. Cl.
*G06Q 10/06* (2012.01)

(52) U.S. Cl.
CPC ...................................... *G06Q 10/06* (2013.01)

(58) Field of Classification Search
None
See application file for complete search history.

(56) References Cited

U.S. PATENT DOCUMENTS

| | | | |
|---|---|---|---|
| 5,371,780 A | 12/1994 | Amitay | |
| 6,006,194 A | 12/1999 | Merel | |
| 6,236,981 B1 | 5/2001 | Hill | |
| 6,438,539 B1 | 8/2002 | Korolev et al. | |
| 6,550,881 B1 | 4/2003 | Phillips | |
| 6,553,568 B1 | 4/2003 | Fijolek et al. | |
| 6,678,700 B1 | 1/2004 | Moore et al. | |
| 6,732,140 B1 | 5/2004 | McCue | |
| 6,754,739 B1 | 6/2004 | Kessler et al. | |
| 6,842,899 B2 | 1/2005 | Moody et al. | |
| 6,859,927 B2 | 2/2005 | Moody et al. | |
| 6,925,493 B1 | 8/2005 | Barkan et al. | |
| 6,947,987 B2 | 9/2005 | Boland | |
| 6,968,323 B1 * | 11/2005 | Bansal et al. | 705/80 |
| 6,987,578 B2 | 1/2006 | Alexander | |
| 7,062,559 B2 | 6/2006 | Yoshimura et al. | |
| 7,099,681 B2 | 8/2006 | O'Neill | |
| 7,103,580 B1 * | 9/2006 | Batachia et al. | 705/80 |
| 7,103,847 B2 | 9/2006 | Alford, Jr. et al. | |
| 7,177,832 B1 | 2/2007 | Semret et al. | |

(Continued)

OTHER PUBLICATIONS

Nisan ("Bidding and Allocation in Combinatorial Auctions", Proceedings of the 2nd ACM conference on Electronic commerce, 2000).*
Guttman et al., "Cooperative vs. Competitive Multi-Agent Negotiations in Retail Electronic Commerce", MIT Media Laboratory, 1998, p. 135-147.*
U.S. Appl. No. 11/756,360, Office Action dated Feb. 8, 2010.
U.S. Appl. No. 11/756,325, Office Action dated Feb. 2, 2010.
U.S. Appl. No. 11/755,985,Office Action, dated Jan. 29, 2010.

(Continued)

*Primary Examiner* — Eric C Wai
(74) *Attorney, Agent, or Firm* — Lisa Ulrich; Hoffman Warnick LLC (57) ABSTRACT

This invention outlines a method that distributes the decision-making process according to the application owners' needs, through the use of chip management and brokering technologies in an auction-like environment which allows for very fluid business need changes. This disclosure describes a master framework for a family of disclosures which allows consumers to more efficiently obtain, modify, and utilize computing resources from providers. These elemental biddable resources are obtained through several brokering algorithms and associated winning bid strategies which redefine how applications and businesses can receive the most appropriate service for the least cost, at the most appropriate interval. The resource management framework includes business units, buyer's agents, resource unit brokers, resource unit capacity planners, and resource allocation software, and an optional change and configuration manager.

15 Claims, 3 Drawing Sheets

(56) References Cited

U.S. PATENT DOCUMENTS

| | | | |
|---|---|---|---|
| 7,177,838 | B1 | 2/2007 | Ling |
| 7,222,345 | B2 | 5/2007 | Gray et al. |
| 7,249,099 | B2 | 7/2007 | Ling |
| 7,266,523 | B2 | 9/2007 | Depura et al. |
| 7,401,035 | B1 | 7/2008 | Young |
| 7,634,430 | B2 * | 12/2009 | Huberman et al. ........... 705/26.3 |
| 7,640,547 | B2 | 12/2009 | Neiman et al. |
| 7,899,696 | B2 | 3/2011 | Boss et al. |
| 7,899,697 | B2 | 3/2011 | Boss et al. |
| 8,041,600 | B2 | 10/2011 | Boss et al. |
| 8,140,446 | B2 | 3/2012 | Boss et al. |
| 8,332,859 | B2 | 12/2012 | Boss et al. |
| 2001/0034688 | A1 | 10/2001 | Annunziata |
| 2001/0042032 | A1 | 11/2001 | Crawshaw et al. |
| 2002/0065766 | A1 | 5/2002 | Brown et al. |
| 2002/0073014 | A1 | 6/2002 | Gilbert |
| 2002/0091624 | A1 | 7/2002 | Glodjo et al. |
| 2002/0128949 | A1 | 9/2002 | Wiesehuegel et al. |
| 2002/0135796 | A1 | 9/2002 | Alexander |
| 2002/0147675 | A1 | 10/2002 | Das et al. |
| 2002/0174052 | A1 | 11/2002 | Guler et al. |
| 2003/0018562 | A1 | 1/2003 | Guler et al. |
| 2003/0023540 | A2 | 1/2003 | Johnson et al. |
| 2003/0035429 | A1 | 2/2003 | Mitra et al. |
| 2003/0041007 | A1 | 2/2003 | Grey et al. |
| 2003/0041011 | A1 | 2/2003 | Grey et al. |
| 2003/0041014 | A1 | 2/2003 | Grey et al. |
| 2003/0055729 | A1 | 3/2003 | Bezos et al. |
| 2003/0069828 | A1 | 4/2003 | Blazey et al. |
| 2003/0071861 | A1 | 4/2003 | Phillips |
| 2003/0083926 | A1 | 5/2003 | Semret et al. |
| 2003/0101124 | A1 | 5/2003 | Semret et al. |
| 2003/0167329 | A1 | 9/2003 | Kurakake et al. |
| 2003/0216971 | A1 | 11/2003 | Sick et al. |
| 2003/0233305 | A1 * | 12/2003 | Solomon ........................ 705/37 |
| 2004/0010592 | A1 | 1/2004 | Carver et al. |
| 2004/0024687 | A1 | 2/2004 | Delenda |
| 2004/0059646 | A1 | 3/2004 | Harrington et al. |
| 2004/0083160 | A1 | 4/2004 | Byde et al. |
| 2004/0111308 | A1 | 6/2004 | Yakov |
| 2004/0133506 | A1 | 7/2004 | Glodjo et al. |
| 2004/0133609 | A1 | 7/2004 | Moore et al. |
| 2004/0149294 | A1 | 8/2004 | Gianchandani et al. |
| 2004/0230317 | A1 | 11/2004 | Kumar et al. |
| 2005/0055306 | A1 | 3/2005 | Miller et al. |
| 2005/0071182 | A1 | 3/2005 | Aikens et al. |
| 2005/0138621 | A1 | 6/2005 | Clark et al. |
| 2005/0141554 | A1 | 6/2005 | Hammarlund et al. |
| 2005/0144115 | A1 | 6/2005 | Brett |
| 2005/0149294 | A1 | 7/2005 | Gebhart |
| 2005/0192865 | A1 | 9/2005 | Boutilier et al. |
| 2005/0207340 | A1 | 9/2005 | O'Neill |
| 2005/0256946 | A1 | 11/2005 | Childress et al. |
| 2005/0278240 | A1 * | 12/2005 | Delenda ........................ 705/37 |
| 2005/0289042 | A1 | 12/2005 | Friesen |
| 2005/0289043 | A1 | 12/2005 | Maudlin |
| 2006/0047550 | A1 | 3/2006 | Dineen et al. |
| 2006/0059075 | A1 | 3/2006 | Hurewitz |
| 2006/0069621 | A1 | 3/2006 | Chang et al. |
| 2006/0080210 | A1 | 4/2006 | Mourad et al. |
| 2006/0080224 | A1 | 4/2006 | Schuelke et al. |
| 2006/0080438 | A1 | 4/2006 | Storrie |
| 2006/0149576 | A1 * | 7/2006 | Ernest et al. ...................... 705/1 |
| 2006/0149652 | A1 | 7/2006 | Fellenstein et al. |
| 2006/0167703 | A1 * | 7/2006 | Yakov ............................... 705/1 |
| 2006/0195386 | A1 | 8/2006 | Glodjo et al. |
| 2007/0087756 | A1 | 4/2007 | Theisen et al. |
| 2007/0118419 | A1 | 5/2007 | Maga et al. |
| 2007/0136176 | A1 | 6/2007 | Niedermeier |
| 2007/0276688 | A1 | 11/2007 | Sun et al. |
| 2008/0080552 | A1 * | 4/2008 | Gates et al. .................. 370/468 |

OTHER PUBLICATIONS

Araque, Jr., Gerardo, U.S. Appl. No. 11/756,313, filed May 31, 2007, Office Action dated Mar. 25, 2011, 33 pages.
Rankins, William E., U.S. Appl. No. 11/756,374, filed May 31, 2007, Office Action dated Mar. 11, 2011, 17 pages.
Nguyen, Nga B., U.S. Appl. No. 11/756,406, filed May 31, 2007, Final Office Action dated Feb. 22, 2011, 15 pages.
Garg, Yogesh C., U.S. Appl. No. 11/756,442, filed May 31, 2007, Office Action dated Feb. 10, 2011, 35 pages.
Mahapatra et al., "Oracle Parallel Processing", Copyright 2000, O'Reilly & Associates.
U.S. Appl. No. 11/756,426, filed May 31, 2007, Final Office Action dated Mar. 24, 2010, 20 pages.
U.S. Appl. No. 11/756,416, filed May 31, 2007, Final Office Action dated Mar. 24, 2010, 14 pages.
U.S. Appl. No. 11/756,400, filed May 31, 2007, Final Office Action dated Mar. 24, 2010, 20 pages.
U.S. Appl. No. 11/756,386, filed May 31, 2007, Final Office Action dated Mar. 24, 2010, 14 pages.
U.S. Appl. No. 11/756,426, Advisory Action dated Jun. 8, 2010, 3 pages.
U.S. Appl. No. 11/756,400, Advisory Action dated Jun. 8, 2010, 3 pages.
U.S. Appl. No. 11/756, 360, Notice of Allowance and Fees Due dated May 19, 2010, 6 pages.
Boss et al, U.S. Appl. No. 11/756,325, Office Action Communication, Apr. 27, 2009, 10 pages.
Boss et al, U.S. Appl. No. 11/756,360, Office Action Communication, Apr. 24, 2009, 12 pages.
Boss et al, U.S. Appl. No. 11/755,985, Office Action Communication, Apr. 1, 2009, 23 pages.
Duermeyer, Karin, "Methodology: From Component Business Model to Service Oriented Architecture", IBM Business Consulting Services, Nuernberger Kreis—Softwaretag: 7, May 2004, 41 pages.
U.S. Appl. No. 11/756,325, filed May 31, 2007, Notice of Allowance and Fees due dated Jul. 14, 2010, 10 pages.
U.S. Appl. No. 11/755,985, filed May 31, 2007, Final Office Action dated Jul. 1, 2010, 23 pages.
U.S. Appl. No. 11/756,416, filed May 31, 2007, Notice of Allowance and Fees due dated Jun. 30, 2010, 4 pages.
U.S. Appl. No. 11/756,313, filed May 31, 2007, Office Action dated Jun. 29, 2010, 31 pages.
U.S. Appl. No. 11/756,386, filed May 31, 2007, Notice of Allowance and Fees due dated Jun. 29, 2010, 4 pages.
U.S. Appl. No. 11/756,400, filed May 31, 2007, Office Action dated Jun. 24, 2010, 12 pages.
U.S. Appl. No. 11/756,426, filed May 31, 2007, Office Action dated Jun. 24, 2010, 10 pages.
Ozsomer et al., "A Resource-Based Model of Market Learning in the Subsidiary: The Capabilities of Exploration and Exploitation", Journal of International Marketing, vol. 11, No. 3, 2003.
Staudenmayer, Nancy, "Interdependency: Conceptual, Empirical, and Practical Issues", The International Center for Research on the Management of Technology, Jun. 1997.
Carter, Candice D., U.S. Appl. No. 11/756,426, filed May 31, 2007, Notice of Allowance and Fees Due dated Oct. 20, 2010, 27 pages.
Gregg, Mary M., U.S. Appl. No. 11/755,985, filed May 31, 2007, Office Action dated Oct. 20, 2010, 27 pages.
Carter, Candice D., U.S. Appl. No. 11/756,400, filed May 31, 2007, Notice of Allowance and Fees Due dated Oct. 19, 2010, 26 pages.
Nguyen, Nga, B., U.S. Appl. No. 11/756,406, filed May 31, 2007, Office Action dated Aug. 17, 2010, 32 pages.
Boss, U.S. Appl. No. 11/756,386, Office Action Communication, Oct. 8, 2009, 13 pages.
Boss, U.S. Appl. No. 11/756,400, Office Action Communication, Oct. 8, 2009, 18 pages.
Boss, U.S. Appl. No. 11/756,360, Office Action Communication, Oct. 14, 2009, 13 pages.
Boss, U.S. Appl. No. 11/756,325, Office Action Communication, Oct. 13, 2009, 12 pages.
Boss, U.S. Appl. No. 11/756,416, Office Action Communication, Oct. 14, 2009, 16 pages.
Boss, U.S. Appl. No. 11/755,985, Office Action Communication, Nov. 2, 2009, 16 pages.
Boss, U.S. Appl. No. 11/756,426, Office Action Communication, Oct. 29, 2009, 20 pages.

(56) References Cited

OTHER PUBLICATIONS

Araque Jr., Gerardo, U.S. Appl. No. 11/756,313, filed May 31, 2007, Final Office Action dated Dec. 10, 2010.
Lan, Tzu-Hsiang, U.S. Appl. No. 11/755,971, filed May 31, 2007, Office Action dated Nov. 26, 2010.
Rankins, William E., U.S. Appl. No. 11/756,374, filed May 31, 2007, Office Action dated Oct. 29, 2010. 35 pages.
Araque, Jr., U.S. Appl. No. 11/756,313, Office Action Communication, Aug. 29, 2011, 37 pages.
Garg, U.S. Appl. No. 11/756,442, Notice of Allowance & Fees Due, Sep. 12, 2011, 16 pages.
Gregg, U.S. Appl. No. 11/755,985, Office Action Communication, May 5, 2011, 35 pages.
The University of Melbourne: Annual Budget 2004, 84 pages: www.unimelb.edu.au/publications/docs/budget2004.pdf.
Carter, U.S. Appl. No. 11/756,416, Notice of Allowance & Fees Due, May 17, 2011, 19 pages.
Lan, U.S. Appl. No. 11/755,971, Office Action Communication, May 19, 2011, 16 pages.
Carter, U.S. Appl. No. 11/756,360, Notice of Allowance & Fees Due, May 20, 2011, 19 pages.
Carter, U.S. Appl. No. 11/756,386, Notice of Allowance & Fees Due, May 23, 2011, 19 pages.
Wai, U.S. Appl. No. 11/756,357, Office Action Communication, May 26, 2011, 32 pages.
Chew, U.S. Appl. No. 11/755,980, Office Action Communication, Jun. 23, 2011, 50 pages.
Garg, U.S. Appl. No. 11/756,442, Office Action Communication, Jun. 24, 2011, 8 pages.
Rankins, U.S. Appl. No. 11/756,374, Office Action Communication, Aug. 19, 2011, 19 pages.
Wai, U.S. Appl. No. 11/756,357, Office Action Communication, Nov. 10, 2011, 17 pages.
Nguyen, U.S. Appl. No. 11/456,406, Notice of Allowance and Fees Due, 19 pages.
Gregg, U.S. Appl. No. 11/755,985, Office Action Communication, Dec. 2, 2011, 75 pages.
Lan, U.S. Appl. No. 11/755,971, Notice of Allowance & Fees Due, Jul. 8, 2013, 12 pages.
Chew, U.S. Appl. No. 11/755,980, Notice of Allowance & Fees Due, Aug. 6, 2012, 18 pages.
Lan, U.S. Appl. No. 11/755,971, Final Office Action, Nov. 21, 2012, 17 pages.
Chew, U.S. Appl. No. 13/571,904, Notice of Allowance & Fees Due, Sep. 27, 2013, 11 pages.
Lan, U.S. Appl. No. 11/755,971, Office Action Communication, Jun. 22, 2012, 34 pages.
Chew, U.S. Appl. No. 13/571,904, Office Action, Mar. 28, 2013, 32 pages.
Lan, U.S. Appl. No. 11/755,971, Office Action, May 14, 2013, 16 pages.
Rankins, U.S. Appl. No. 11/756,374, Notice of Allowance and Fees Due, Dec. 16, 2011, 22 pages.
Gaudiano et al., "Dynamic Resource Allocation for a Sensor Network", Manuscript #335, Jun. 1, 2005, 21 pages.
Glass, "Creating Socially Conscious Agents: Decision-Making in the Context of Group Commitments", Computer Science Group, Harvard University, Apr. 1999, 33 pages.
Chew, U.S. Appl. No. 11/755,980, Office Action Communication, Dec. 20, 2011, 32 pages.
Wai, U.S. Appl. No. 11/756,357, Office Action, Sep. 12, 2013, 29 pages.
Lan, U.S. Appl. No. 14/061,214, Office Action Communication, Jan. 17, 2014, 14 pages.
U.S. Appl. No. 11/756,357, Office Action, Apr. 4, 2014, 14 pages.
U.S. Appl. No. 11/756,313, Office Action, May 1, 2014, 96 pages.
Lan, Tzu-Hsiang, U.S. Appl. No. 14/061,214, Office Action Jul. 8, 2014, 24 pages.
Araque Jr., Gerardo, U.S. Appl. No. 11/756,313, Office Action, Sep. 16, 2014, 51 pgs.
U.S. Appl. No. 14/061,214, Final Office Action dated Nov. 8, 2014, (IBME-0297-CON), 36 pages.
U.S. Appl. No. 11/756,357, Office Action 3 dated Dec. 18, 2014, (IBME-0286), 19 pages.
U.S. Appl. No. 11/756,313, Final Office Action 3 dated Feb. 5, 2015, (IBME-0290), 101 pgs.
U.S. Appl. No. 11/756,357, Notice of Allowance dated May 26, 2015, (IBME-0286) 20 pgs.

\* cited by examiner

RESOURCE MANAGEMENT FRAMEWORK FOR HOLDING AUCTIONS AND APPLYING SERVICE LEVEL CHARACTERISTICS IN RESPONSE TO BIDS FOR RESOURCES

CROSS-REFERENCE TO RELATED APPLICATIONS

This application is related in some aspects to commonly owned Pat. No. 8,041,599, entitled "METHOD, SYSTEM, AND PROGRAM PRODUCT FOR SELECTING A BROKERING METHOD FOR OBTAINING DESIRED SERVICE LEVEL CHARACTERISTICS", filed concurrently herewith, the entire contents of which are herein incorporated by reference.

This application is related in some aspects to commonly owned patent application Ser. No. 11/756,374, entitled "NON-DEPLETING CHIPS FOR OBTAINING DESIRED SERVICE LEVEL CHARACTERISTICS", filed concurrently herewith, the entire contents of which are herein incorporated by reference.

This application is related in some aspects to commonly owned patent application Ser. No. 11/756,357, entitled "DISCRETE, DEPLETING CHIPS FOR OBTAINING DESIRED SERVICE LEVEL CHARACTERISTICS", filed concurrently herewith, the entire contents of which are herein incorporated by reference.

This application is related in some aspects to commonly owned patent application number (to be provided), entitled "DISCRETE, DEPLETING CHIPS FOR OBTAINING DESIRED SERVICE LEVEL CHARACTERISTICS", filed concurrently herewith, the entire contents of which are herein incorporated by reference.

This application is related in some aspects to commonly owned Pat. No. 7,840,433, entitled "FLUID, DEPLETING CHIPS FOR OBTAINING DESIRED SERVICE LEVEL CHARACTERISTICS", filed concurrently herewith, the entire contents of which are herein incorporated by reference.

This application is related in some aspects to commonly owned patent application Ser. No. 11/755,980, entitled "INTELLEGENT BUYER'S AGENT USAGE FOR ALLOCATION OF SERVICE LEVEL CHARACTERISTICS", filed concurrently herewith, the entire contents of which are herein incorporated by reference.

This application is related in some aspects to commonly owned patent application Ser. No 11/755,985, entitled "METHOD, SYSTEM, AND PROGRAM PRODUCT FOR ALLOCATING A RESOURCE", filed concurrently herewith, the entire contents of which are herein incorporated by reference.

This application is related in some aspects to commonly owned patent application Ser. No. 11/756,313, entitled "APPLICATION OF BROKERING METHODS TO AVAILABILITY CHARACTERISTICS", filed concurrently herewith, the entire contents of which are herein incorporated by reference.

This application is related in some aspects to commonly owned Pat. No. 8,041,600, entitled "APPLICATION OF BROKERING METHODS TO PERFORMANCE CHARACTERISTICS", filed concurrently herewith, the entire contents of which are herein incorporated by reference.

This application is related in some aspects to commonly owned Pat. No. 7,899,696, entitled "APPLICATION OF BROKERING METHODS TO RECOVERABILITY CHARACTERISTICS", filed concurrently herewith, the entire contents of which are herein incorporated by reference.

This application is related in some aspects to commonly owned Pat. No. 7,899,697, entitled "APPLICATION OF BROKERING METHODS TO SECURITY CHARACTERISTICS", filed concurrently herewith, the entire contents of which are herein incorporated by reference.

This application is related in some aspects to commonly owned Pat. No. 8,032,407, entitled "APPLICATION OF BROKERING METHODS TO SCALABILITY CHARACTERISTICS", filed concurrently herewith, the entire contents of which are herein incorporated by reference.

This application is related in some aspects to commonly owned patent application Ser. No. 11/756,406, entitled "APPLICATION OF BROKERING METHODS TO OPERATIONAL SUPPORT CHARACTERISTICS", filed concurrently herewith, the entire contents of which are herein incorporated by reference.

This application is related in some aspects to commonly owned Pat. No. 8,117,074, entitled "SCALING OFFERS FOR ELEMENTAL BIDDABLE RESOURCES (EBRs)", filed concurrently herewith, the entire contents of which are herein incorporated by reference.

This application is related in some aspects to commonly owned patent application Ser. No.11/755,971, entitled "SERVICE REQUESTS FOR MULTIPLE SERVICE LEVEL CHARACTERISTIC", filed concurrently herewith, the entire contents of which are herein incorporated by reference.

FIELD OF THE INVENTION

This application describes a master framework that allows consumers to more efficiently obtain, modify, and utilize computing resources from providers. These elemental bidding resources are obtained through several brokering algorithms and associated winning bid strategies which redefine how applications and businesses can receive the most appropriate service for the least cost, at the most appropriate interval.

BACKGROUND OF THE INVENTION

Businesses are experiencing an ever-increasing trend to achieve higher utilization of computing resources. Companies that provide their own IT computing services are being driven to find ways to decrease costs by increasing utilization. Moreover, companies that provide these services are being driven to reduce overhead and become more competitive by increasing utilization of these resources. Numerous studies over the past decade have shown that typical utilization levels of computing resources within service delivery centers, raised floors, and data centers fall between 20% and 80%. This leaves a tremendous amount of white space with which to improve utilization and drive costs down.

One reason this large amount of white space of under-utilized equipment exists is that most applications which run on these computing resources have service level agreements (SLAs) which define a certain minimum level of performance which that application can expect. An SLA will also define a penalty incurred by the provider or software delivery center (SDC) organization if those service levels are ever violated. To avoid these costly penalties, service providers will typically over-provision the hardware assigned to the applications in question. Common practice within the industry is to define these static SLAs, their associated penalties for missed performance, as well as contract length, and then get bids from various providers. All things being equal, those service providers with the lowest cost for that SLA will get the business.

Today's Information Technology (IT) landscape introduces new technologies that virtualizes computing resources, and are designed to improve this situation. Virtualization involves technologies like the Virtualization Engine, Enterprise Workload Manager, and Partition Workload Manager which are commercially available from IBM Corp. of Armonk, N.Y. (Virtualization Engine, Enterprise Workload Manager, Partition Workload Manager, and IBM are trademarks of IBM Corp. in the United States and/or other countries). Such technologies basically allow computing resources such as processing cycles, Memory, and Input/Output (I/O) to be reassigned from one logical server to another in an on-demand fashion. Virtualization then allows for computing resources to be dynamically reassigned to the servers or applications which need it, at that time when they need it. Such recent virtualization introductions bring an opportunity to redefine how applications and businesses can receive the most appropriate service for the least cost, providing services only when and where they are needed.

Many organizations today provision computing resources for peak capacity. In other words, they provision enough resources to meet an SLA for the period of time they expect the highest load (demand) on the system. This produces a highly inefficient utilization of IT resources but does guarantee the ability to meet an SLA. Other organizations will profile applications to determine at which times of the day, days of the week, or days of the year they might expect peak capacity needs. For example, a human resources (HR) application might only get used at the end or beginning of the year, a retail inventory system might get its highest use between Thanksgiving and Christmas, a financial tool might get its highest use at the end of every month or quarter. After profiling applications, an organization can then combine applications with non-overlapping peak periods onto the same computing resources or servers so that they can consume more of the white space and thus increase their utilization, while maintaining a reasonable expectation of meeting the SLAs for the combination of applications on that physical resource.

Still other organizations use virtualization technologies to dynamically adjust computing resources from one application server or logical partition to another application server. This scaling of hardware resources to meet software application demands can be done vertically or horizontally. Dynamic Vertical scaling is accomplished with technologies like Enterprise Workload Manager (EWLM), Product Lifecycle Management (PLM), and hypervisors such as: (1) Xen, which is commercially available from XenSource, Inc. of Palo Alto, Calif.; (2) Trango, which is commercially available from Trango Systems of Grenoble, France; and (3) VMware, which is commercially available from IBM Corp. of Armonk, N.Y. (each of these products are trademarks of their respective commercial sources in the United States and/or other countries). Such technologies use policy-based business goals to assign priorities to applications, and adjust resources according to importance levels and transactional performance. Horizontal scaling can be accomplished with software technologies like IBM's WebSphere XD and Tivoli Intelligent Orchestrator, which will provision additional servers and add them to computing clusters to address an increased application load (WebSphere, WebSphere XD, Tivoli, and Tivoli Intelligent Orchestrator are trademarks of IBM Corp. in the United States and/or other countries).

A problem that is yet unaddressed with existing known technologies is that SLAs are still a static entity, with very little flexibility to change. This is particularly obvious when contrasted to computing resources, which in turn have an extremely high degree of flexibility to dynamic change. Using today's technology, a service provider can only statically set the business goals for a portfolio of applications and once set, there is no mechanism to dynamically change the service levels according to the application owners' requirements.

SUMMARY OF THE INVENTION

In general, the present invention provides a resource management framework that distributes the decision-making process according to the application owners' needs, through the use of resource (e.g., chip) management and brokering technologies in an auction-like environment which allows for very fluid business need changes. This disclosure describes a master framework for a family of disclosures (cross-referenced above), which allows consumers to more efficiently obtain, modify, and utilize computing resources from providers. These elemental biddable resources are obtained through any combination of several brokering algorithms and associated winning bid strategies which redefine how applications and businesses can receive the most appropriate service for the least cost, at the most appropriate interval. The resource management framework comprises business units, buyer's agents, resource unit brokers, resource unit capacity planners, and resource allocation software.

A first aspect of the invention provides a resource management framework, comprising: agents for receiving priorities and computing needs from buyers, and for programmatically determining a most advantageous negotiation strategy for bidding based on the priorities and computing needs; and a resource unit broker for receiving bids from the agents, for applying service level characteristics, and for determining a winning bid.

A second aspect of the invention provides a method for managing resources, comprising: receiving priorities and computing needs at agents from buyers; programmatically determining a most advantageous negotiation strategy for bidding based on the priorities and computing needs with the agents; receiving bids from the agents on a resource unit broker; and applying service level characteristics and determining a winning bid with the resource unit broker.

A third aspect of the invention provides a program product stored on at least one computer readable medium for managing resources, the at least one computer readable medium comprising program code for causing at least one computer system to: receive priorities and computing needs; programmatically determine a most advantageous negotiation strategy for bidding based on the priorities and computing needs; receive bids from agents; and apply service level characteristics and determine a winning bid.

A fourth aspect of the invention provides a method for deploying a system for managing resources, comprising: providing a computer infrastructure being operable to: receive priorities and computing needs; programmatically determine a most advantageous negotiation strategy for bidding based on the priorities and computing needs; receive bids for the resources from agents; and apply service level characteristics and determine a winning bid.

A fifth aspect of the invention provides a data processing system for managing resources, comprising: a processing unit; a bus coupled to the processing unit; and a memory medium coupled to the bus comprising program code, which when executed by the processing unit causes the data processing system to: receive priorities and computing needs; programmatically determine a most advantageous negotiation strategy for bidding based on the priorities and computing needs; receive bids from agents; apply service level characteristics and determine a winning bid.

A sixth aspect of the invention provides computer software embodied in at least one propagated signal for managing resources, the at least one propagated signal comprising instructions for causing at least computer system to: receive priorities and computing needs; programmatically determine a most advantageous negotiation strategy for bidding based on the priorities and computing needs; receive bids from agents; and apply service level characteristics and determine a winning bid.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience purposes, the Detailed Description of the Invention has the following sections:
I. General Description
II. Computerized Implementation I. General Description As used herein, the following terms have the following definitions:

"Chip" means any unit (virtual or otherwise) that may be exchanged for resources such as IT resources.

"Party" means any individual, group of individuals, department, business unit, cell of a component business model, etc.

"Discrete Event" means a scheduled event such as an auction.

"Fluid Event" means any non-scheduled event such as a random purchase.

"Service Level Characteristic" means any type of computer or IT requirement needed by the business, including any non-functional requirements that specify criteria that can be used to judge the operation of a system, rather than specific behaviors.

"Elemental Bidding Resource (EBR)" means any computational resource (e.g., memory, processing cycles, etc) sought by a party to accomplish objectives.

The present invention provides a resource management framework that distributes the decision-making process according to the application owners' needs, through the use of (computational) resource (e.g., chip) management and brokering technologies in an auction-like environment which allows for very fluid business need changes. This disclosure describes a master framework for a family of disclosures (cross-referenced above), which allows consumers to more efficiently obtain, modify, and utilize computing resources from providers. These elemental biddable resources are obtained through several brokering algorithms and associated winning bid strategies which redefine how applications and businesses can receive the most appropriate service for the least cost, at the most appropriate interval. The resource management framework comprises business units, buyer's agents, resource unit brokers, resource unit capacity planners, resource allocation software, and an optional resource unit change and configuration manager.

Business units comprise one or more consumers and can represent groups within a business, multiple peer groups, or multiple businesses, all of which can be in competition for resources from a provider. Service providers are represented by an "auctioneer" called the Resource Unit Broker. Buyer's agents are electronic agents which represent business units. The Resource Unit Capacity Planner reports to Resource Unit Brokers (e.g., auctioneers) what resources are available (e.g., infrastructure components) at any given time. Resource Allocation Software includes products such as EWLM, WebSphere XD, and Partition Load Manager. The goal-oriented policies within these products are updated by inputs from the Resource Unit Broker and Capacity Planner. Change management may be all self-contained in resource allocation software, or there may be cases where additional change control needs to be performed. This functionality is provided herein by an optional resource unit change and configuration manager. In addition, as used herein, the term "set" shall mean one or more.

Figure 1:
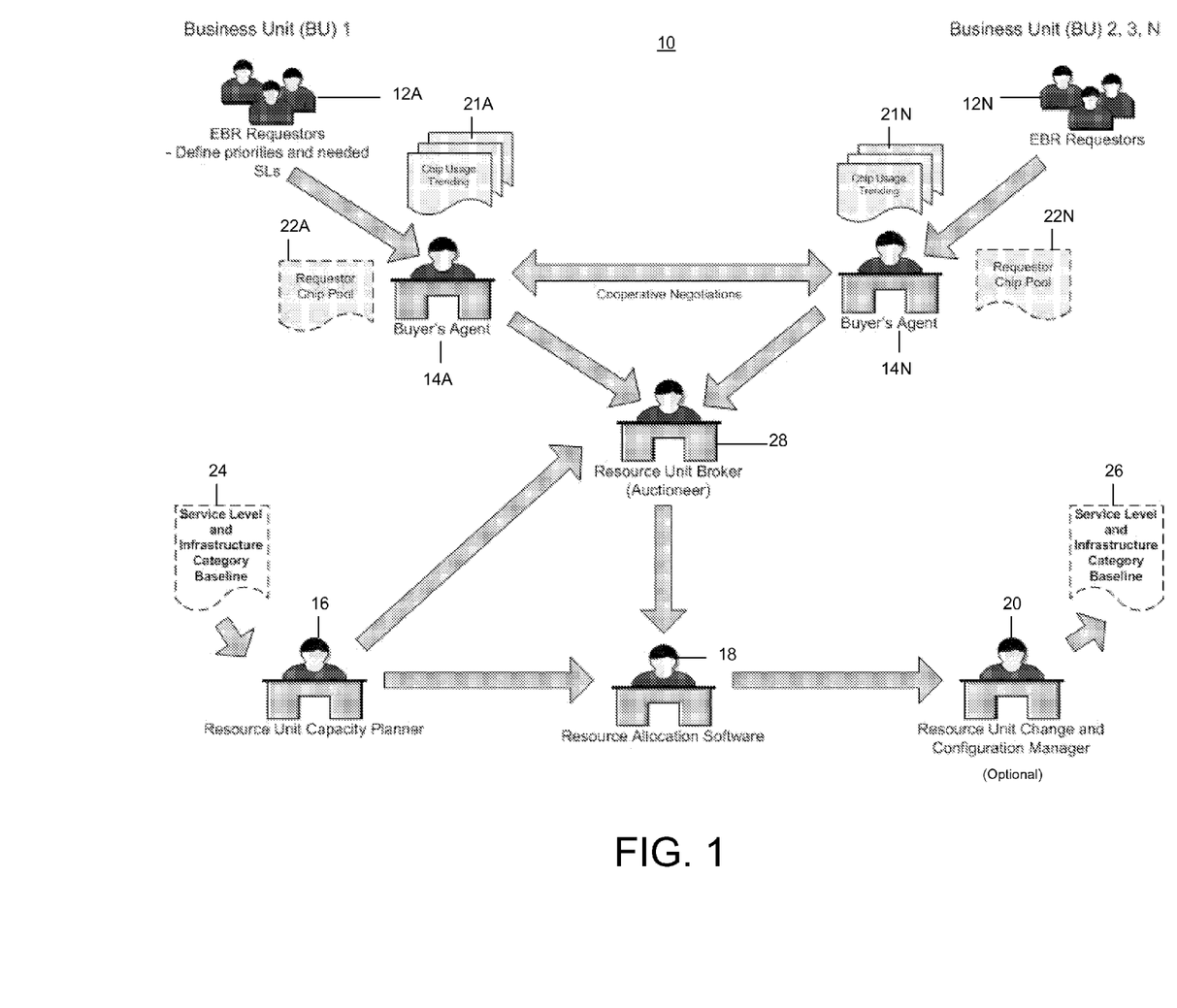
FIG. 1 shows an illustrative resource management framework according to the present invention.

Referring now to FIG. 1, resource management framework (hereinafter framework 10) is depicted. As shown, framework 10 is generally comprised of business units 12A-N, buyer's agents 14A-N, resource unit capacity planner 16, optional resource unit change and configuration manager 20, and resource unit broker 28. These components typically leverage additional assets such as chip usage trending 21A-N, requestor chip pool 22A-N, service level and infrastructure category baseline 24, and service level and infrastructure category baseline 26.

An objective of framework 10 is to reach a means of maximizing utilization of IT Resources among competing consumers by distribution of the decision making/allocation process according to relative needs of applications. Doing so eliminates the need for traditional SLAs, and allows each business unit to make dynamic "free market" decisions as to how best obtain the service levels required from a highly-commoditized IT service provider.

To this end, business units 12A-N relay their priorities and computing needs to the buyer's agents 14A-N. Buyer's agents 14A-N then determine whether to engage in cooperative or competitive negotiations (as further described in, which was cross-referenced and incorporated above) and implement a bid for an elemental resource (as further described in, which was cross-referenced and incorporated above) on the business units' 12A-N behalf. Various methods can be employed by the resource unit broker 28 to auction off resources to consumers or business units 12A-N. One method is using discrete, static (i.e., non-depleting) chips (as further described in, which was cross-referenced and incorporated above). Another method is involves discrete, depleting chips (as further described in, which was cross-referenced and incorporated above), and yet another involves the use of fluid chips (as further described in, which was cross-referenced and incorporated above). The buyer's agents 14A-N understand the thresholds business units 14A-N are willing to pay, their associated targets for various service level characteristics, and will programmatically employ the most advantageous bidding strategy.

The resource unit capacity planner 16 reports to resource unit brokers 28 (e.g., auctioneers) what resources are available (e.g., infrastructure components) at any given time. Resource allocation software 18 includes products such as EWLM, WebSphere XD, and Partition Load Manager. The goal-oriented policies within these products are updated by inputs from the resource unit broker 28 and/or resource unit broker capacity planner 16. Change management may be all self-contained in resource allocation software 18, or there may be cases where additional change control needs to be performed. This functionality is provided herein by optional resource unit change and configuration manager 20.

In any event, once a winning bid is achieved, resource unit broker 28 then uses various methods to apply service level characteristics including availability (as further described in, which was cross-referenced and incorporated above), performance (as further described in, which was cross-referenced and incorporated above), recoverability (as further described in, which was cross-referenced and incorporated above), security (as further described in, which was cross-referenced and incorporated above), scalability (as further described in, which was cross-referenced and incorporated above), and operational support (as further described in, which was cross-referenced and incorporated above). Auctions and corresponding bids can be placed in isolation for any of the above service level characteristics or they can be combined in all or in part to achieve a holistic service level agreement (as further described in, which was cross-referenced and incorporated above). This scenario covers those situations where one service level characteristic in isolation is not meaningful or useful without a corresponding characteristic. For example, it may be unnecessary to obtain a winning bid for scalability in order to support a larger population if that same application cannot simultaneously achieve sufficient security. In this case, there are defined relationships between scalability and performance, so any resource spent to win one auction needs to account for similar outcomes in another auction. This is described in, which was cross-referenced and incorporated above. Finally, which was cross-referenced and incorporated above, describes a scenario where multiple buyers' agents 14A-N are requesting similar or identical resources, and these requests can be combined into a single service level offering which returns savings to the business unit and provides more resources for the broker to auction off.

Figure 2:
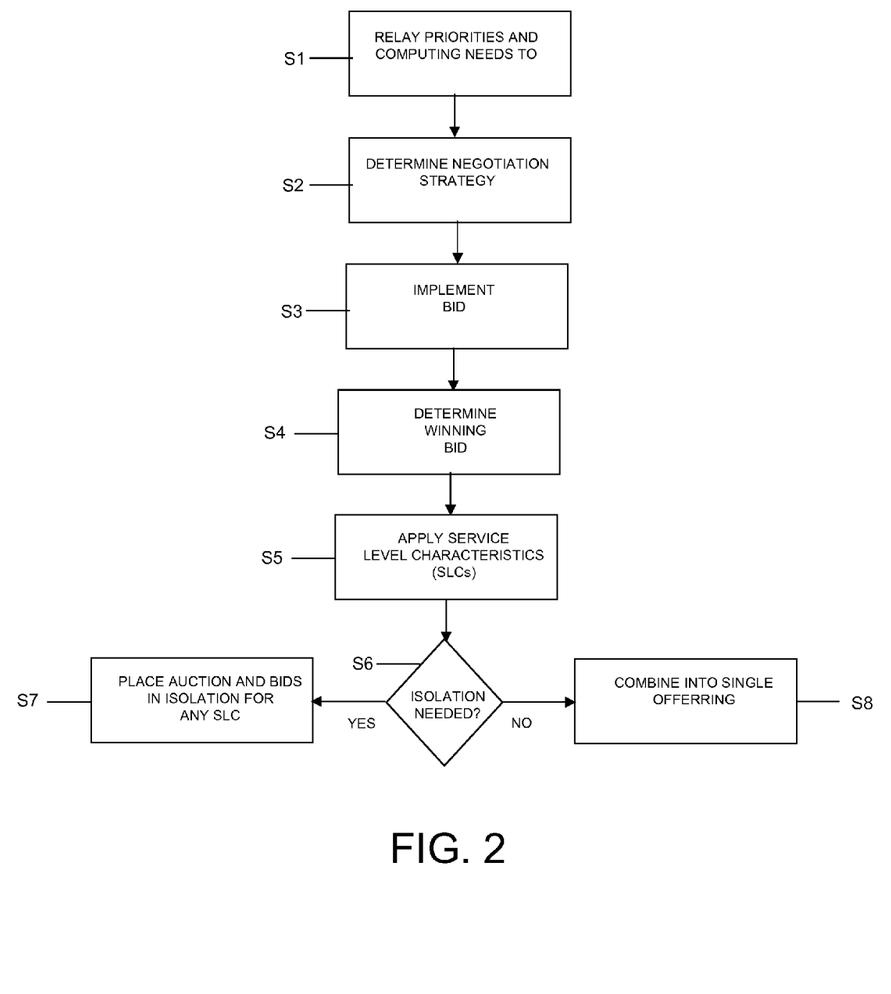
FIG. 2 shows an illustrative method flow diagram according to the present invention.

Referring now to FIG. 2, these steps will be described in the context of a method flow diagram. In step S1, business units relay their priorities and computing needs to the buyer's agents. Buyer's agents then determine whether to engage in cooperative or competitive negotiations in step S2, and implement a bid for an elemental resource on the business unit's behalf in step S3. Various methods can be employed by the resource unit broker 28 to auction off resources to consumers or business units. One method is using discrete, static (i.e., non-depleting) chips. Another method involves discrete, depleting chips, and yet another involves the use of fluid chips. The buyer's agents understand the thresholds business units are willing to pay, their associated targets for various service level characteristics, and will programmatically employ the most advantageous bidding strategy.

Once a winning bid is achieved in step S4, the resource unit broker 28 then uses various methods to apply service level characteristics including availability, performance, recoverability, security, scalability, and operational support in step S5. In step S6, it is determined whether the auction and corresponding bids should be placed in isolation in step S7. If so, the auction and bids are placed in isolation in step S7. As mentioned above, auctions and corresponding bids can be placed in isolation for any of the above service level characteristics or they can be combined in all or in part to achieve a holistic service level agreement. This scenario covers those situations where one service level characteristic in isolation is not meaningful or useful without a corresponding characteristic. For example, it may be unnecessary to obtain a winning bid for scalability in order to support a larger population if that same application cannot simultaneously achieve sufficient security. In this case, there are defined relationships between scalability and performance, so any resource spent to win one auction needs to account for similar outcomes in another auction. Accordingly, where multiple buyers' agents are requesting similar or identical resources, and these requests can be combined into a single service level offering that returns savings to the business units and provides more resources for the broker to auction off, they can be combined into a single offering in step S8.

II. Computerized Implementation

Figure 3:
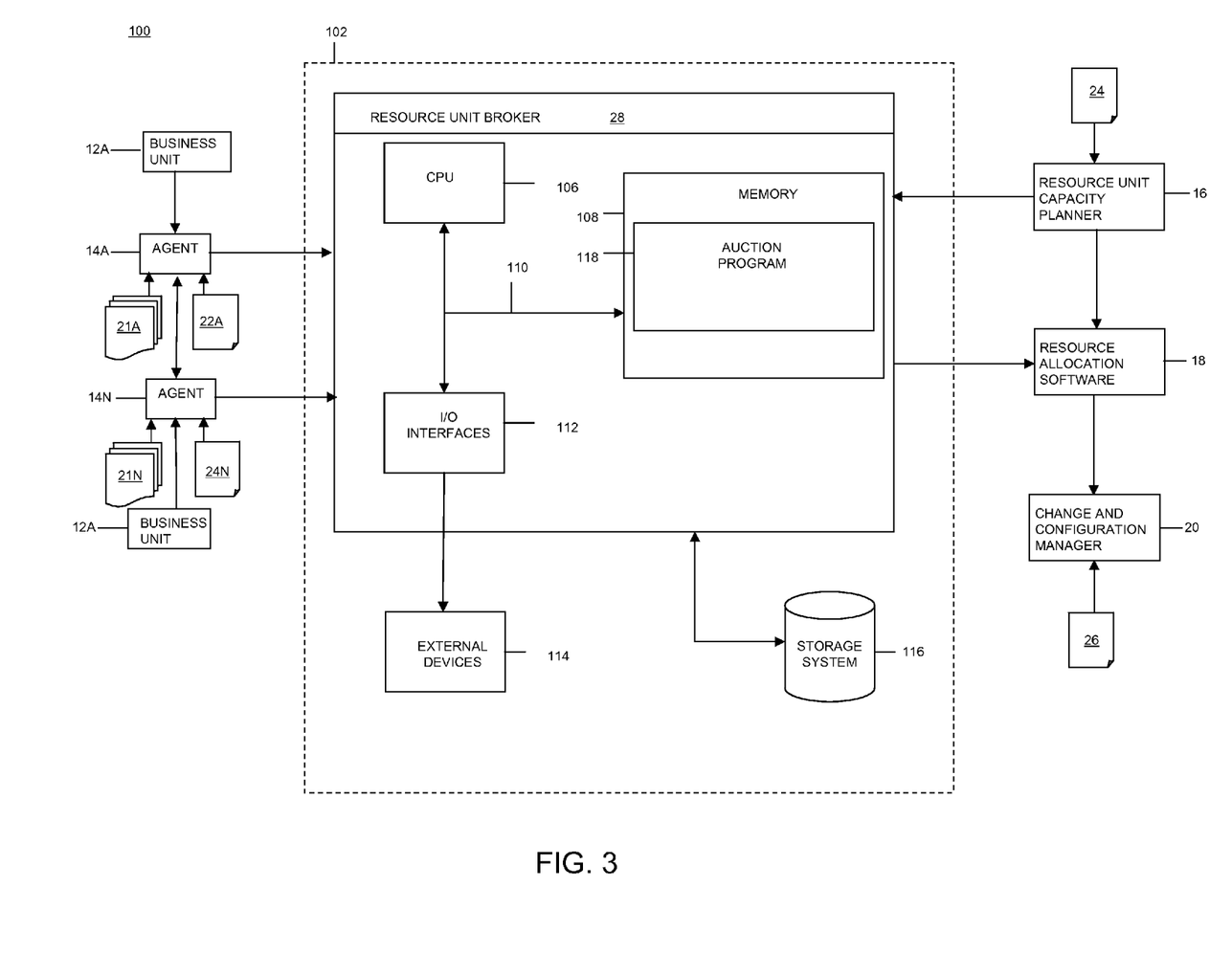
FIG. 3 shows a more specific computerized implementation of the present invention.

Referring now to FIG. 3, a more detailed diagram of a computerized implementation 100 of the present invention is shown. As depicted, implementation 100 includes resource unit broker 28 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc. by a service provider who offers to implement, deploy, and/or perform the functions of the present invention for others.

As shown, resource unit broker 28 includes a processing unit 106, a memory 108, a bus 110, and input/output (I/O) interfaces 112. Further, resource unit broker 28 is shown in communication with external I/O devices/resources 114 and storage system 116. In general, processing unit 106 executes computer program code, such as auction program 118, which is stored in memory 108 and/or storage system 116. While executing computer program code, processing unit 106 can read and/or write data to/from memory 108, storage system 116, and/or I/O interfaces 112. Bus 110 provides a communication link between each of the components in resource unit broker 28. External devices 114 can comprise any devices (e.g., keyboard, pointing device, display, etc.) that enable a user to interact with resource unit broker 28 and/or any devices (e.g., network card, modem, etc.) that enable resource unit broker 28 to communicate with one or more other computing devices.

Computer infrastructure 102 is only illustrative of various types of computer infrastructures for implementing the invention. For example, in one embodiment, computer infrastructure 102 comprises two or more computing devices (e.g., a server cluster) that communicate over a network to perform the various process of the invention. Moreover, resource unit broker 28 is only representative of various possible computer systems that can include numerous combinations of hardware. To this extent, in other embodiments, resource unit broker 28 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 106 may comprise a single processing unit, or be distributed across one or more processing units in one or more locations, e.g., on a client and server. Similarly, memory 108 and/or storage system 116 can comprise any combination of various types of data storage and/or transmission media that reside at one or more physical locations. Further, I/O interfaces 112 can comprise any system for exchanging information with one or more external device 114. Still further, it is understood that one or more additional components (e.g., system software, math co-processing unit, etc.) not shown in FIG. 3 can be included in resource unit broker 28. However, if resource unit broker 28 comprises a handheld device or the like, it is understood that one or more external devices 114 (e.g., a display) and/or storage system 116 could be contained within resource unit broker 28, not externally as shown.

Storage system 116 can be any type of system (e.g., a database) capable of providing storage for information under the present invention. To this extent, storage system 116 could include one or more storage devices, such as a magnetic disk drive or an optical disk drive. In another embodiment, storage system 116 includes data distributed across, for example, a local area network (LAN), wide area network (WAN) or a storage area network (SAN) (not shown). In addition, although not shown, additional components, such as cache memory, communication systems, system software, etc., may be incorporated into resource unit broker 28.

It should be understood that although shown as separate entities in FIG. 3, one or more of agents 14A-N, resource unit capacity planner 16, resource allocation software, and change and configuration manager 20 can be included in one or more common computer systems (e.g., with resource unit broker 28) and/or in one or more common computer infrastructures (e.g., computer infrastructure 102). In the event that multiple computer systems are provided (e.g., separate from that of resource unit broker 28, it is understood that such computer systems will have components similar to that of resource unit broker 28.

Shown in memory 108 of resource unit broker 28 is auction program 118, which provides the auction based function of resource unit broker 28 as described above. It should be understood that agents 14A-N, resource unit capacity planner 16, resource allocation software 18, and change and configuration manager 20 perform their respective functions as described above. This also includes leveraging additional assets such as chip trending usage 21A-N, requestor chip pool 22A-N, service level and infrastructure category baseline 24, and service level and infrastructure category baseline 26 in performing these functions. Each of the components shown in FIG. 3 can comprise hardware, software (program code stored on a computer readable medium that causes a computer system to perform the respective functions), or a combination of hardware and software.

While shown and described herein as a method and framework for managing resources, it is understood that the invention further provides various alternative embodiments. For example, in one embodiment, the invention provides a computer-readable/useable medium that includes computer program code to enable a computer infrastructure to manage resources. To this extent, the computer-readable/useable medium includes program code that implements each of the various processes of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 108 (FIG. 3) and/or storage system 116 (FIG. 3) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process of the invention on a subscription, advertising, and/or fee basis. That is, a service provider, such as a Solution Integrator, could offer to manage resources. In this case, the service provider can create, maintain, support, etc., a computer infrastructure, such as computer infrastructure 102 (FIG. 3) that performs the process of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for managing resources. In this case, a computer infrastructure, such as computer infrastructure 102 (FIG. 3), can be provided and one or more systems for performing the process of the invention can be obtained (e.g., created, purchased, used, modified, etc.) and deployed to the computer infrastructure. To this extent, the deployment of a system can comprise one or more of: (1) installing program code on a computing device, such as resource unit broker 28 (FIG. 3), from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

A data processing system suitable for storing and/or executing program code can be provided hereunder and can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or I/O devices (including, but not limited to, keyboards, displays, pointing devices, etc.) can be coupled to the system either directly or through intervening I/O controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems and Ethernet cards.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A resource management framework, comprising:
    a set of computer devices that includes at least one computer device and having:
    agents for receiving priorities and computing needs from buyers, and for programmatically determining, based on the priorities and computing needs received by the agents, whether a negotiation strategy for bidding that is cooperative or a negotiation strategy that is competitive will more effectively achieve the priorities and computing needs; and
    a resource unit broker for receiving bids from agents, wherein the bids reflect the determining, for applying service level characteristics to groups of resources in response to the bids, the service level characteristics comprising a combination of at least two different characteristics selected from a group consisting of: availability, performance, recoverability, security, scalability, and operational support; determining by the resource unit broker, after the bids have been received, a winning bid to apply the service level characteristics and determining whether any auctions and corresponding winning bids can be placed in isolation for any of the selected service level characteristics or determining whether to combine any of the auctions and corresponding winning bids in all or in part to achieve a holistic service level agreement when the agents are requesting similar or identical resources.

2. The resource management framework of claim 1, further comprising a resource unit capacity planner for reporting to the resource unit broker what resources are available at any given time.

3. The resource management framework of claim 2, further comprising resource allocation software for allocating resources based on a set of goal-oriented policies and for managing changes to the resource management framework, the set of goal-oriented policies being updateable based on input from the resource unit broker and the resource unit capacity planner.

4. The resource management framework of claim 1, further comprising a change and configuration manager for managing changes and configuration of the resource management framework.

5. A method for managing resources, comprising:
    receiving priorities and computing needs at agents from buyers;
    programmatically determining, based on the priorities and computing needs received by the agents, whether a negotiation strategy for bidding that is cooperative or a negotiation strategy that is competitive will more effectively achieve the priorities and computing needs with the agents;
    receiving bids from the agents, wherein the bids reflect the determining, on a resource unit broker;
    applying service level characteristics to groups of resources in response to the bids with the resource unit broker, the service level characteristics comprising a combination of at least two different characteristics selected from a group consisting of: availability, performance, recoverability, security, scalability, and operational support; and
    determining by the resource unit broker, after the bids have been received, a winning bid to apply the service level characteristics and determining whether any auctions and corresponding winning bids can be placed in isolation for any of the selected service level characteristics or determining whether to combine any of the auctions and corresponding winning bids in all or in part to achieve a holistic service level agreement when the agents are requesting similar or identical resources.

6. The method of claim 5, further comprising reporting to the resource unit broker what resources are available at any given time with a resource unit capacity planner.

7. The method of claim 6, further comprising:
    allocating resources based on a set of goal-oriented policies with resource allocation software; and
    managing changes to a resource management framework with the resource allocation software.

8. The method of claim 7, further comprising updating the set of goal-oriented policies based on input from the resource unit broker or the resource unit capacity planner.

9. The method of claim 7, further comprising managing changes and configuration of a resource management framework with a change and configuration manager.

10. A program product stored on at least one non-transitory computer readable medium for managing resources, the at least one computer readable medium comprising program code for causing at least one computer system to:
    receive priorities and computing needs at agents from buyers;
    programmatically determine, based on the priorities and computing needs received by the agents, whether a negotiation strategy for bidding that is cooperative or a negotiation strategy that is competitive will more effectively achieve the priorities and computing needs;
    receive bids from the agents, wherein the bids reflect the determining, on a resource unit broker;
    apply service level characteristics to groups of resources in response to the bids with the resource unit broker, the service level characteristics comprising a combination of at least two different characteristics selected from a group consisting of: availability, performance, recoverability, security, scalability, and operational support; and
    determining by the resource unit broker, after the bids have been received, a winning bid to apply the service level characteristics and determining whether any auctions and corresponding winning bids can be placed in isolation for any of the selected service level characteristics or determining whether to combine any of the auctions and corresponding winning bids in all or in part to achieve a holistic service level agreement when the agents are requesting similar or identical resources.

11. The program product of claim 10, the at least one non-transitory computer readable storage comprising program code for causing the at least one computer system to: report what resources are available at any given time.

12. The program product of claim 10, the at least one non-transitory computer readable storage comprising program code for causing the at least one computer system to: allocate resources based on a set of goal-oriented policies; and manage changes to a resource management framework.

13. The program product of claim 12, the at least one non-transitory computer readable medium comprising program code for causing the at least one computer system to: update the set of goal-oriented policies.

14. The program product of claim 10, the at least one non-transitory computer readable storage comprising program code for causing the at least one computer system to: manage changes and configurations.

15. A method for deploying a system for managing resources, comprising: providing a computer infrastructure being operable to: receive priorities and computing needs at agents from buyers;

programmatically determine, based on the priorities and computing needs receive by the agents, whether a negotiation strategy for bidding that is cooperative or a negotiation strategy that is competitive will more effectively achieve the priorities and computing needs;

receive bids for the resources from the agents, wherein the bids reflect the determining, on a resource unit broker;

apply service level characteristics in response to the bids with the resource unit broker, the service level characteristics comprising a combination of at least two different characteristics selected from a group consisting of: availability, performance, recoverability, security, scalability, and operational support; and determine by the resource unit broker, after the bids have been received, a winning bid to apply the service level characteristics and determine whether any auctions and corresponding winning bids can be placed in isolation for any of the selected service level characteristics or determine whether to combine any of the auctions and corresponding winning bids in all or in part to achieve a holistic service level agreement when the agents are requesting similar or identical resources.

* * * * *